(12) United States Patent
Chandler et al.

(10) Patent No.: US 6,328,908 B1
(45) Date of Patent: Dec. 11, 2001

(54) HEAT AND MASS TRANSFER ADDITIVES FOR IMPROVED AQUEOUS ABSORPTION FLUIDS

(75) Inventors: Travis Chandler; Uwe Rockenfeller, both of Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/353,171

(22) Filed: Jul. 14, 1999

Related U.S. Application Data

(63) Continuation of application No. 08/878,232, filed on Jun. 17, 1997, which is a continuation of application No. 08/499,313, filed on Jul. 7, 1995, now abandoned.

(51) Int. Cl.[7] .............................. C09K 5/00; C10M 5/00; F25D 5/00
(52) U.S. Cl. .................. 252/67; 252/69; 252/71; 62/112; 62/476
(58) Field of Search .................... 252/67, 69, 71; 62/112, 476

(56) References Cited

U.S. PATENT DOCUMENTS

| | | |
|---|---|---|
| 3,609,087 | 9/1971 | Chi et al. . |
| 4,413,479 | 11/1983 | Rojey . |
| 4,428,854 | 1/1984 | Ejno et al. . |
| 4,875,915 | 10/1989 | Rockenfeller . |
| 5,419,145 | 5/1995 | Chandler et al. . |

Primary Examiner—Yogendra N. Gupta
Assistant Examiner—D Hamlin
(74) Attorney, Agent, or Firm—Knobbe, Marten, Olson & Bear LLP

(57) ABSTRACT

The rate of water vapor sorption of an absorption cycle cooling and/or heating system using an aqueous alkali metal halide solution as the working fluid is increased by adding to the fluid an effective additive amount of at least 2 parts per million of an aliphatic, cycloaliphatic, or aromatic ketone or aldehyde capable of increasing the rate of water vapor absorption.

22 Claims, No Drawings

HEAT AND MASS TRANSFER ADDITIVES FOR IMPROVED AQUEOUS ABSORPTION FLUIDS

This application is a continuation-in-part of application Ser. No. 08/878,232, filed Jun. 17, 1997, which is a continuation of application Ser. No. 08/499,313, filed Jul. 7, 1995, abandoned.

BACKGROUND OF THE INVENTION

The present invention is directed to aqueous absorption refrigeration or cooling systems in which water, as the sole refrigerant, is absorbed in an absorber by an aqueous absorption fluid, often referred to as a working fluid. Aqueous absorption fluids containing heat and mass transfer additives improve the absorption system performance by increasing water vapor absorption rates. For example, in U.S. Pat. Nos. 5,419,145 and 5,577,388, amines are shown to be effective additives for improving the performance of aqueous absorption fluids. The presence of such additives improves water cooling temperature changes in the absorber, increases the power load and heat and mass transfer, and reduces the observed process vapor pressure, as well as providing other advantages. The present invention describes other heat and mass transfer additives for improving performance of the systems in which the working fluids containing the additives are used.

SUMMARY OF THE INVENTION

According to the present invention, aqueous absorption working fluids are improved by adding effective amounts of an aliphatic, cycloaliphatic or aromatic ketone or aldehyde having between 5 and 24 carbon atoms. The improved heat and mass transfer additives are used in aqueous metal salt solutions. The presence of the effective amount of ketone or aldehyde increases the rate of water vapor absorption by the absorption fluid thereby achieving important advantages and improvements in system performance. The improvements include absorber power load increases and improvements in the change of absorber fluid concentrations. Further improvements include increases in overall heat transfer coefficients and sorption fluid side film heat transfer coefficients. The advantage of such improved absorption fluid performance allows for reduction of sorber heat exchange surface areas needed to satisfy a given load resulting in reduction of absorber size and costs. These and other improvements and advantages will be evident from the following detailed description.

DETAILED DESCRIPTION OF THE INVENTION

The specific improved aqueous absorption solutions used in the system of the present invention are aqueous solutions of metal salts. The preferred metal salts are alkali metal halides, particularly lithium bromide, lithium chloride and lithium iodide and mixtures of two or more of them. The most preferred working fluid is an aqueous solution of lithium bromide as the only substantial absorbent present in the aqueous solution as used in today's absorption chillers. In such solutions, a small amount of metal hydroxide may be present for pH corrosion control, typically between about 0.05 and about 0.15 normal. However, in addition to the preferred lithium bromide, one or more of the following salts may also be present: $ZnCl_2$, $ZnBr_2$, $MnCl_2$, $MnBr_2$, $MgCl_2$, $MgBr_2$, $SrCl_2$, $SrBr_2$, $CaCl_2$, $CaBr_2$, $FeCl_2$, $FeBr_2$, LiCl, LiI, $LiNO_2$, $LiNO_3$, LiSCN and $LiClO_3$. The amount of salt present, whether lithium bromide alone or a mixture of two or more of the aforesaid salts is preferably between about 40% and about 85%, by weight. The aforesaid LiBr aqueous absorption solutions are well known to those skilled in the art as disclosed, for example, in U.S. Pat. No. 3,478,530.

Ketones may also be used with aqueous solutions containing alkali metal hydroxides. The alkali metal hydroxide absorption fluids are aqueous solutions of sodium hydroxide, potassium hydroxide or mixtures thereof. Preferred hydroxide compositions are those utilizing a mixture of the two hydroxides, and preferably those in which the total hydroxide concentration is between about 30% and about 80%, by weight. It has been found that optimum energy storage potentials are realized when sodium hydroxide is present between about 35% and about 75%, by weight, of the combined sodium hydroxide and potassium hydroxide weight. The amount of sodium hydroxide present in the salt mixture for systems at crystallization temperatures above 30° C. is 50% or above, whereas for temperatures below 30° C., the preferred amount of sodium hydroxide is at or below 50% of the salt mixture. The most preferred amount of sodium hydroxide is between 40% and 55% of the combined weight of sodium hydroxide and potassium hydroxide for crystallization temperatures below 30° C. In addition to the aforesaid sodium and/or potassium hydroxide solutions, relatively small amounts of other alkali metal hydroxides may be added as well. Thus, the hydroxide solutions may contain up to about 50% cesium, rubidium, and/or about 35% lithium hydroxide, based on the weight of sodium and/or potassium hydroxides. It has been found that aldehydes are not effective heat and mass transfer additives with metal hydroxides.

The heat and mass transfer additives of the invention are aliphatic, cycloaliphatic, and aromatic ketones and aldehydes having between 5 and 24 carbon atoms. Preferred additives are normally liquid at system operating conditions, for example, between about 30° C. and up to 100° C. or more. Effective additives have a normal boiling point of at least about 100° C. at atmospheric pressure. Compounds having boiling points of 180° C. or higher are particularly preferred. The additives may be soluble or insoluble in the brine working fluid. However, insoluble compounds must be liquid at 20° and above, whereas soluble additives may be solid as a pure compound at ambient temperatures but must fully dissolve and not form precipitates at 20° or higher. Additives of the present invention may be used in systems with absorber temperatures down to about 15° C. if they are selected from compounds having a melting point less than the absorber temperature. The additives may be liquid over a wider temperature range, both higher and lower, without adversely affecting the operation of the invention.

The ketone additives of the invention are of the formula $R_1(C=O)R_2$ wherein $R_1$ and/or $R_2$ are aliphatic or substituted aliphatic groups of from 1 to 12 carbon atoms or are cycloaliphatic or aromatic or substituted cycloaliphatic or aromatic groups of from 6 to 12 carbon atoms, respectively. Where the hydrocarbon groups are alkyl groups, and wherein $R_1$ or $R_2$ is a methyl group, the carbon atom of the other alkyl group attached to the carbonyl group is a primary or tertiary carbon atom. Thus, ketones having $R_1$ as a methyl group and the other alkyl group $R_2$ having a secondary carbon atom attached to the carbonyl group such as 3-methyl-2-heptanone as disclosed in U.S. Pat. No. 3,609,087 have inferior heat and mass transfer properties in LiBr absorption fluids as compared to ketones of the present invention, and are specifically excluded. Preferred aliphatic ketones are those in which $R_1$ and $R_2$ are alkyl groups having from 1 to 8 carbon atoms. Either or both of the alkyl groups may be substituted, preferably halogen substituted, and more preferably fluoro substituted. Examples of preferred aliphatic ketones include 4-methyl-2-pentanone, 5-methyl-2-hexanone, 3,3-dimethyl-2-hexanone, 2-pentanone, 3-pentanone, 2,4-dimethyl-3-pentanone, 2-hexanone, 3-hexanone, 4methyl-2-hexanone, 5-methyl-2-hexanone, 2-heptanone, 3-heptanone, 4-heptanone, 2-octanone, 3-octanone, 4-octanone, 2,6-dimethyl-4-heptanone, nonanone, decanone and undecanone. Cycloaliphatic ketones, and particularly cyclohexanone, cyclooctanone, decalone and alkyl and halogen substituted derivatives are also effective additives. Aromatic ketones include acetophenone (methyl phenyl ketone), propiophenone (ethyl phenyl ketone), tetralone and benzophenone (diphenyl ketone) and their alkyl and halogen substituted derivatives. Specific examples include alpha-tetralone and 4-methylpropiophenone.

The aldehydes used as heat and mass transfer additives within the scope of the invention are aliphatic aldehydes having from 5 to 24 carbon atoms, and more preferably from 6 to 14 carbon atoms in the aliphatic or alkyl chain, which also may be halogen substituted. Specific aliphatic aldehydes are hexanal, heptanal, octanal, nonanal, decanal, etc. and longer chain aldehydes for example, lauryl aldehyde (C-12) and myristic aldehyde (C-14). Useful aromatic aldehydes include benzaldehyde, anisaldehyde and substituted aromatic aldehydes including ether and hydroxy substituted compounds such as vanillin (3-methoxy-4-hydroxy benzaldehyde).

The ketones and aldehydes may also include one or more other functional groups, particularly halogens and more preferably chlorine or fluorine substituted molecules as previously disclosed. In addition, the molecules may also contain alcohol, thiol, amine, and ether groups, provided such functional groups do not cause the additive to form a precipitate or otherwise induce chemical instability in the presence of the metal salt solutions. Combinations of ketones and/or aldehydes may also be found suitable for different salts or salt combinations.

Additives may be selected from the aforesaid group of compounds based on their vapor pressures, boiling points and/or molecular weights. Additives having comparatively lower volatility are preferred. The comparative volatilities of different candidates may be approximated from their boiling points as pure compounds. However, because the vapor pressure of the heat and mass transfer additive is suppressed in the presence of absorbent salts in the same way that water vapor pressure is, the better measure of volatility is the partial pressure of the additive when saturated with absorbent or refrigerant under chiller absorber or evaporator conditions. The extent of the partial pressure suppression depends on the chemical structure of the additive and also on the concentration of the absorbent solution. Less volatility is generally found with higher molecular weight additives. The upper limit on molecular weights is practically limited by the melting point of the additives, which, as previously noted, must be liquids under normal chiller operating conditions, including evaporator conditions. Accordingly, the additive should not solidify when exposed to water at about 4° C., or form solid crystalline hydrates with the chilled refrigerant water. Similarly, the additive should not form solid materials when in contact with absorbent solution under absorber conditions, typically LiBr at 61% and 32° C. However, higher solution concentrations may be used, with temperatures as low as 25° C. for non-standard conditions, or at different conditions when alternate absorption fluids are used.

Effective additive amounts of ketone or aldehyde added to the aqueous salt solutions for the purpose of improving heat and mass transfer are from at least about two parts per million up to about 50,000 ppm, preferably up to about 20,000 ppm, by weight. Preferred concentrations are between about 2 ppm and 10,000 ppm and more preferably between about 5 ppm and about 5,000 ppm. However, optimal performance is usually between about 100 and about 500 ppm. A slow deterioration in performance is found at very high concentrations, of say 40,000 ppm or 50,000 ppm or more. At such very high concentrations, the additive has long since passed its solubility limit and gathers in a separate organic layer floating on top of the brine or refrigerant. A very thick layer of additive does not contribute to chiller performance, and instead becomes a burden on chiller efficiency and operation. Mixtures of the aforesaid additives may also be used. In addition to mixtures of the ketones and aldehydes, the additives may be used with other known heat and mass trafer additives which may be present or added to the absorption fluid. Examples of such known additives are alcohols, particularly those having 6–10 carbon atoms such as 2-ethylhexanol or n-octanol and amines disclosed in U.S. Pat. Nos. 5,419,145 and 5,577,388, the descriptions of which are incorporated herein by reference.

According to the invention, it has been found that the presence of one or more ketones or aldehydes in the aforesaid aqueous absorption fluids results in substantially improved heat and mass transfer performance of the absorption working fluid composition. Specifically, the performance of the system improves in the following manner: a significantly larger increase in cooling water temperature change is found in the absorber, for a constant water flow rate; the absorber power load increases proportional to the change in water cooling temperature; the steady state process vapor pressure drops, and if brought back to its initial value to achieve a constant evaporator temperature, the change in concentration of the absorber fluid increases significantly; the absorber solution subcooling, i.e., the difference between the maximum temperature at equilibrium (saturation) and the actual solution temperature, is decreased by several degrees; the absorber heat exchanger tube (solution side) interface comprises a highly agitated turbulent film as compared to a generally laminar flow pattern without the presence of the additive; and the overall heat transfer coefficients and sorption fluid film heat transfer coefficients are increased.

As previously noted, water vapor absorption systems incorporating the heat and mass transfer additives in the aqueous alkali metal absorption solutions of the invention include a number of different types of systems incorporating one or more absorbers in which water vapor absorption solutions are typically used. Such equipment includes absorption chillers and refrigeration systems as disclosed in U.S. Pat. Nos. 4,966,007, 5,038,574 and 5,186,009, thermal energy storage systems as disclosed in U.S. Pat. No. 4,823,864, as well as multiple effect absorption systems, for example, double effect and dual loop systems disclosed in U.S. Pat. Nos. 3,266,266 and 4,542,628, triple effect systems disclosed in U.S. Pat. Nos. 5,335,515 and 5,390,509 and multiple effect systems resulting from a combination of single or double effect apparatus such as the triple effect system comprising combined single effect circuits as described in U.S. Pat. No. 5,205,136 as well as single effect chillers and commonly used double effect chillers and heat transformers. The aqueous working fluids of the invention may also contain a corrosion inhibitor such a chromate, nitrate, tungstate or molybdate, as disclosed for example in U.S. Pat. Nos. 5,186,009 and 5,335,515, or any other suitable corrosion inhibitors. Where aldehydes are present, the use of certain corrosion inhibitors may be restricted to avoid aldehyde oxidation.

To illustrate the improvement of system performance by using the heat and mass transfer additives of the present invention, the following examples are provided. In the Table, additives within the scope of the present invention are shown by way of example. The results given are for a constant set of operating conditions and include: initial cooling water ("Tube") temperature of 30° C., a system water vapor pressure of 10 mbar, 7° C. dew point (evaporator temperature), initial aqueous solution concentration of 60% LiBr, initial solution flow rate of 500 grams/min except for 2-octanone and 4-methyl-2-pentanone using 400 grams/min., and initial solution temperature of 48° C. entering the absorber, using a special bench test absorption machine. The water and solution temperatures, flow rates and concentrations, and vapor pressures are monitored by electronic sensors during operation.

The results are based on heat transfer equations well known to practitioners of the art. The absorber load dQ/dt, shown as W, is calculated from the water temperature, heat capacity of water, and water flow rates, $$\frac{dQ}{dt} = (T_{H_2O,out} - T_{H_2O,in}) * C_p(H_2O) * \frac{dm_{H_2O}}{dt}$$

For the heat transfer coefficients, the temperature change is treated as the log mean differential temperature, where $$LMDT = \frac{(T_{Sol,in} - T_{H_2O,out}) - (T_{Sol,out} - T_{H_2O,in})}{\ln(T_{Sol,in} - T_{H_2O,out}) - \ln(T_{Sol,out} - T_{H_2O,in})}$$

The outside film heat transfer coefficient $h_0$ is calculated from $$h_o = \frac{1}{\frac{1}{U_o} - R_{i,m}}$$

where $$U_o = \frac{\frac{dQ}{dt}}{LMDT * (\text{tube area})}$$

and where $R_{i,m}$ is the thermal resistivity of the inside cooling water and copper metal tube wall. Solution subcooling is the temperature difference ($\Delta T$) between the actual solution temperature leaving the absorber and the calculated absorber solution equilibrium temperature at the measured concentration and system vapor pressure values. Solution concentration change (dx) is measured to give mass transfer of water while cooling water side temperature ($H_2O$ dT) measures heat transfer. Lower subcooling temperature values reflect greater system efficiency as do increased outside film heat transfer coefficients ($h_o$), $H_2O$ dT and dx measurements. The value calculated for solution subcooling is one measure of the efficiency of the system for water vapor absorption, with lower subcooling temperatures indicating an improvement. However, under certain conditions, the derived subcooling numbers may be contrary to other direct measurements of water vapor absorption. In the Table some data show higher calculated solution subcooling while also showing increased water vapor absorption rates by increases in absorber loads, and increases in heat and mass transfer coefficients. Thus, the derived subcooling results are to be checked against other direct evidence of increased absorption rates.

TABLE

| Additive | [Additive] ppm | $H_2O$ dT ° C. | Solution dx % | Abs. Load W | $h_o$ W/m²K | Subcooling ° C. |
| --- | --- | --- | --- | --- | --- | --- |
| 2-octanone (bp 173° C.) | | | | | | |
| | 0 | 0.77 | 2.02 | 900 | 1110 | 6.03 |
| | 0 | 0.76 | 1.98 | 880 | 976 | 4.41 |
| | 0 | 0.79 | 2.20 | 915 | 996 | 3.69 |
| | 0 | 0.79 | 2.22 | 914 | 1011 | 3.99 |
| | 0 | 0.72 | 2.16 | 835 | 920 | 5.39 |
| | 0 | 0.79 | 2.23 | 921 | 1068 | 4.43 |
| | 5.3 | 1.54 | 3.82 | 1784 | 3591 | 4.73 |
| | 5.3 | 1.52 | 3.98 | 1773 | 3105 | 3.49 |
| | 5.3 | 1.50 | 3.89 | 1739 | 2897 | 3.17 |
| | 5.3 | 1.49 | 3.86 | 1735 | 2795 | 2.96 |
| | 5.3 | 1.37 | 3.47 | 1596 | 2309 | 2.55 |
| | 11.9 | 1.61 | 3.99 | 1866 | 3809 | 4.13 |
| | 11.9 | 1.61 | 4.13 | 1866 | 3641 | 3.66 |
| | 11.9 | 1.61 | 4.17 | 1866 | 3768 | 3.97 |
| | 19.7 | 1.64 | 4.12 | 1908 | 4333 | 4.56 |
| | 19.7 | 1.61 | 3.92 | 1872 | 4225 | 4.69 |
| | 19.7 | 1.60 | 4.09 | 1893 | 4083 | 4.56 |
| | 47.3 | 1.62 | 3.81 | 1878 | 4803 | 5.51 |
| | 47.3 | 1.60 | 4.23 | 1960 | 4862 | 4.94 |
| | 47.3 | 1.68 | 4.09 | 1953 | 4948 | 5.02 |
| | 47.3 | 1.65 | 4.07 | 1919 | 4555 | 4.91 |
| | 47.3 | 1.64 | 4.37 | 1902 | 4356 | 4.75 |
| | 93.4 | 1.68 | 4.11 | 1946 | 4977 | 5.36 |
| | 93.4 | 1.66 | 4.17 | 1927 | 4752 | 4.63 |
| | 93.4 | 1.65 | 4.14 | 1914 | 4651 | 4.61 |
| | 191.6 | 1.52 | 3.84 | 1770 | 4425 | 5.70 |

TABLE-continued

| Additive | [Additive] ppm | H₂O dT °C. | Solution dx % | Abs. Load W | $h_o$ W/m²K | Subcooling °C. |
|---|---|---|---|---|---|---|
| | 191.6 | 1.58 | 3.92 | 1833 | 4726 | 5.48 |
| | 191.6 | 1.54 | 3.69 | 1791 | 5420 | 6.73 |
| 2-octanone | | | | | | |
| | 300 | 1.59 | 3.92 | 1848 | 5168 | 6.22 |
| | 300 | 1.59 | 3.92 | 1848 | 5168 | 6.22 |
| | 300 | 1.55 | 3.89 | 1799 | 4754 | 6.52 |
| | 300 | 1.60 | 3.96 | 1858 | 5218 | 6.00 |
| | 300 | 1.60 | 4.07 | 1893 | 5160 | 5.80 |
| | 300 | 1.69 | 3.99 | 1965 | 5295 | 5.58 |
| | 400 | 1.57 | 4.00 | 1819 | 4497 | 5.33 |
| | 400 | 1.66 | 4.26 | 1923 | 4805 | 5.03 |
| | 400 | 1.66 | 4.21 | 1925 | 4752 | 5.00 |
| | 400 | 1.69 | 4.20 | 1959 | 4778 | 5.17 |
| | 400 | 1.65 | 3.97 | 1917 | 4632 | 5.46 |
| | 400 | 1.66 | 4.03 | 1924 | 4711 | 5.44 |
| | 500 | 1.55 | 3.72 | 1805 | 4494 | 5.66 |
| | 500 | 1.56 | 3.79 | 1813 | 4430 | 5.63 |
| | 500 | 1.61 | 3.90 | 1872 | 4756 | 5.39 |
| | 500 | 1.63 | 3.97 | 1895 | 4762 | 5.36 |
| | 500 | 1.67 | 3.91 | 1936 | 5090 | 5.44 |
| | 500 | 1.64 | 4.03 | 1909 | 4845 | 5.33 |
| | 750 | 1.52 | 3.76 | 1768 | 4228 | 5.82 |
| | 750 | 1.57 | 3.82 | 1824 | 4402 | 5.83 |
| | 750 | 1.69 | 4.05 | 1959 | 4737 | 5.17 |
| | 750 | 1.60 | 3.81 | 1853 | 4792 | 5.28 |
| 4-methyl-2-pentanone (bp 117° C.) | | | | | | |
| | 0 | 0.87 | 3.90 | 938 | 997 | 2.29 |
| | 0 | 0.77 | 3.62 | 837 | 952 | 3.60 |
| | 0 | 0.81 | 3.81 | 879 | 961 | 3.10 |
| | 0 | 0.90 | 3.38 | 978 | 1154 | 5.02 |
| | 0 | 0.83 | 3.11 | 901 | 1041 | 4.88 |
| | 0 | 0.89 | 3.24 | 960 | 1133 | 4.83 |
| | 5 | 1.17 | 2.85 | 1272 | 1788 | 2.79 |
| 4-methyl-2-pentanone | | | | | | |
| | 5 | 1.20 | 3.07 | 1331 | 1795 | 3.51 |
| | 5 | 1.20 | 3.01 | 1300 | 1770 | 3.64 |
| | 10 | 1.24 | 2.75 | 1344 | 2152 | 4.47 |
| | 10 | 1.29 | 3.20 | 1401 | 2199 | 4.61 |
| | 10 | 1.26 | 3.07 | 1366 | 2173 | 4.59 |
| | 20 | 1.32 | 3.23 | 1431 | 2384 | 4.69 |
| | 20 | 1.34 | 3.19 | 1450 | 2198 | 3.58 |
| | 20 | 1.32 | 3.23 | 1430 | 2203 | 3.68 |
| | 50 | 1.35 | 3.34 | 1466 | 3211 | 6.81 |
| | 50 | 1.40 | 3.28 | 1516 | 3246 | 6.14 |
| | 50 | 1.39 | 3.28 | 1502 | 3245 | 6.02 |
| | 100 | 1.38 | 3.23 | 1497 | 3575 | 6.98 |
| | 100 | 1.40 | 3.13 | 1519 | 3459 | 7.11 |
| | 100 | 1.38 | 3.12 | 1502 | 3399 | 6.69 |
| | 200 | 1.16 | 2.89 | 1256 | 2849 | 8.02 |
| | 200 | 1.26 | 2.83 | 1370 | 2978 | 7.61 |
| | 200 | 1.31 | 2.89 | 1418 | 3100 | 7.23 |
| | 500 | 1.15 | 2.36 | 1252 | 2750 | 8.53 |
| | 500 | 1.24 | 2.71 | 1346 | 2877 | 7.64 |
| | 500 | 1.27 | 2.81 | 1375 | 2874 | 7.09 |
| cyclohexanone (bp 155° C.) | | | | | | |
| | 0 | 0.91 | 2.24 | 1063 | 1379 | 5.1 |
| | 0 | 0.92 | 2.24 | 1074 | 1369 | 4.7 |
| | 0 | 0.92 | 2.19 | 1072 | 1383 | 4.8 |
| | 5.1 | 1.01 | 2.41 | 1175 | 1443 | 3.3 |
| | 5.1 | 1.01 | 2.42 | 1176 | 1426 | 3.2 |
| | 5.1 | 1.01 | 2.47 | 1171 | 1419 | 3.2 |
| | 10.4 | 1.14 | 2.86 | 1319 | 1560 | 1.6 |
| | 10.4 | 1.13 | 2.80 | 1316 | 1563 | 1.7 |
| cyclohexanone | | | | | | |
| | 10.4 | 1.15 | 2.79 | 1331 | 1688 | 2.9 |
| | 20.5 | 1.32 | 3.20 | 1536 | 2087 | 2.0 |
| | 20.5 | 1.34 | 3.17 | 1556 | 2095 | 1.9 |

TABLE-continued

| Additive | [Additive] ppm | H₂O dT °C. | Solution dx % | Abs. Load W | $h_o$ W/m²K | Subcooling °C. |
|---|---|---|---|---|---|---|
| | 20.5 | 1.33 | 3.19 | 1547 | 2066 | 1.8 |
| | 50.2 | 1.55 | 3.82 | 1804 | 2731 | 1.4 |
| | 50.2 | 1.59 | 3.89 | 1844 | 2632 | 0.9 |
| | 50.2 | 1.56 | 3.81 | 1814 | 2584 | 0.7 |
| | 100 | 1.71 | 4.09 | 1989 | 2977 | 0.5 |
| | 100 | 1.73 | 4.12 | 2009 | 3037 | 0.7 |
| | 200 | 1.69 | 4.26 | 1967 | 3203 | 1.1 |
| | 200 | 1.69 | 4.24 | 1965 | 3122 | 0.8 |
| | 200 | 1.69 | 4.28 | 1963 | 3094 | 0.8 |
| | 348 | 1.68 | 4.26 | 1953 | 3378 | 1.8 |
| | 348 | 1.70 | 4.30 | 1980 | 3222 | 0.9 |
| | 348 | 1.71 | 4.34 | 1991 | 3196 | 0.8 |
| | 501 | 1.70 | 4.30 | 1971 | 3411 | 1.7 |
| | 501 | 1.70 | 4.27 | 1971 | 3420 | 1.6 |
| | 501 | 1.69 | 4.33 | 1966 | 3264 | 1.2 |
| | 100 | 1.63 | 4.15 | 1892 | 3134 | 1.8 |
| | 100 | 1.62 | 4.13 | 1888 | 3081 | 1.5 |
| | 100 | 1.61 | 4.20 | 1872 | 3022 | 1.5 |
| | 1500 | 1.60 | 4.04 | 1811 | 2927 | 2.1 |
| | 1500 | 1.54 | 3.97 | 1786 | 2861 | 1.9 |
| | 1500 | 1.56 | 3.94 | 1808 | 2878 | 1.9 |
| 4-methylpropiophenone (bp 238° C.) | | | | | | |
| | 0 | 0.97 | 1.80 | 1051 | 1253 | 7.75 |
| | 0 | 0.92 | 1.73 | 998 | 1330 | 7.16 |
| | 0 | 0.93 | 1.72 | 1008 | 1338 | 7.11 |
| 4-methylpro- piophenone | | | | | | |
| | 0 | 0.93 | 1.71 | 1009 | 1342 | 7.04 |
| | 5 | 1.52 | 3.30 | 1645 | 2560 | 4.11 |
| | 5 | 1.56 | 3.44 | 1695 | 2630 | 3.55 |
| | 5 | 1.56 | 3.48 | 1692 | 2635 | 3.73 |
| | 5 | 1.57 | 3.49 | 1700 | 2541 | 3.23 |
| | 10 | 1.40 | 3.05 | 1525 | 4163 | 8.71 |
| | 10 | 1.41 | 3.01 | 1533 | 4162 | 8.78 |
| | 10 | 1.40 | 3.00 | 1524 | 4158 | 8.79 |
| | 10 | 1.40 | 3.03 | 1522 | 4180 | 8.65 |
| | 20 | 1.56 | 3.28 | 1696 | 4747 | 7.95 |
| | 20 | 1.35 | 2.84 | 1463 | 4177 | 9.47 |
| | 20 | 1.34 | 2.82 | 1450 | 4254 | 9.44 |
| | 20 | 1.33 | 2.81 | 1443 | 4227 | 9.45 |
| | 50 | 1.31 | 2.82 | 1426 | 4147 | 9.35 |
| | 50 | 1.31 | 2.83 | 1424 | 4094 | 9.41 |
| | 50 | 1.31 | 2.80 | 1427 | 4065 | 9.44 |
| | 100 | 1.32 | 2.78 | 1438 | 4223 | 9.47 |
| | 100 | 1.31 | 2.77 | 1426 | 4150 | 9.46 |
| | 100 | 1.31 | 2.75 | 1424 | 4138 | 9.51 |
| | 200 | 1.43 | 2.99 | 1553 | 4572 | 8.86 |
| | 200 | 1.52 | 3.17 | 1645 | 4693 | 8.19 |
| | 200 | 1.66 | 3.56 | 1802 | 3983 | 6.03 |
| | 200 | 1.69 | 3.62 | 1835 | 4285 | 6.17 |
| | 500 | 1.69 | 3.65 | 1834 | 4503 | 6.27 |
| | 500 | 1.74 | 3.73 | 1885 | 4359 | 5.48 |
| | 500 | 1.78 | 3.84 | 1928 | 4046 | 4.64 |
| | 1000 | 1.08 | 2.20 | 1174 | 1780 | 7.27 |
| | 1000 | 1.05 | 2.17 | 1145 | 1731 | 7.51 |
| | 1000 | 1.08 | 2.11 | 1171 | 1779 | 7.64 |
| | 2000 | 0.99 | 2.00 | 1074 | 1461 | 6.69 |
| | 2000 | 1.01 | 2.06 | 1099 | 1540 | 6.46 |
| | 2000 | 0.96 | 1.99 | 1042 | 1440 | 7.08 |
| α-tetralone (bp 116° C. @ 6 mm) | | | | | | |
| | 0 | 0.91 | 1.79 | 985 | 1248 | 6.38 |
| | 0 | 0.94 | 1.75 | 1021 | 1312 | 6.34 |
| | 0 | 0.93 | 1.76 | 1015 | 1308 | 6.36 |
| | 0 | 0.93 | 1.76 | 1014 | 1310 | 6.43 |
| | 5 | 0.91 | 1.82 | 991 | 1244 | 7.03 |
| | 5 | 0.91 | 1.89 | 992 | 1179 | 5.90 |
| | 5 | 0.91 | 1.87 | 988 | 1189 | 6.08 |
| | 5 | 0.90 | 1.88 | 980 | 1176 | 6.02 |
| | 10 | 0.99 | 2.07 | 1074 | 1327 | 5.47 |
| | 10 | 0.99 | 2.05 | 1076 | 1336 | 5.51 |
| | 10 | 0.99 | 2.05 | 1074 | 1341 | 5.60 |

TABLE-continued

| Additive | [Additive] ppm | H₂O dT °C. | Solution dx % | Abs. Load W | $h_o$ W/m²K | Subcooling °C. |
|---|---|---|---|---|---|---|
| | 20 | 1.10 | 2.26 | 1194 | 1613 | 5.69 |
| | 20 | 1.10 | 2.17 | 1193 | 1617 | 5.85 |
| | 20 | 1.09 | 2.18 | 1185 | 1617 | 5.79 |
| | 50 | 1.37 | 2.98 | 1491 | 2230 | 5.01 |
| | 50 | 1.37 | 2.63 | 1485 | 2126 | 5.53 |
| | 50 | 1.36 | 2.67 | 1476 | 2161 | 5.53 |
| | 50 | 1.34 | 2.67 | 1459 | 2142 | 5.50 |
| | 100 | 1.44 | 2.83 | 1567 | 2470 | 5.40 |
| | 100 | 1.47 | 2.86 | 1601 | 2492 | 5.41 |
| | 100 | 1.47 | 2.84 | 1599 | 2556 | 5.46 |
| | 200 | 1.51 | 2.88 | 1642 | 2580 | 5.05 |
| | 200 | 1.52 | 2.89 | 1654 | 2624 | 4.96 |
| | 200 | 1.51 | 2.88 | 1635 | 2589 | 5.06 |
| | 500 | 1.42 | 3.72 | 1687 | 2531 | 3.27 |
| | 500 | 1.61 | 3.79 | 1752 | 2621 | 2.70 |
| | 500 | 1.59 | 3.80 | 1730 | 2651 | 2.74 |
| a-tetralone | | | | | | |
| | 500 | 1.59 | 3.83 | 1728 | 2637 | 2.74 |
| | 1000 | 1.25 | 3.01 | 1360 | 1605 | 1.94 |
| | 1000 | 1.27 | 3.02 | 1376 | 1647 | 1.96 |
| | 1000 | 1.29 | 3.06 | 1405 | 1722 | 2.00 |
| | 2000 | 1.05 | 2.54 | 1144 | 1357 | 3.70 |
| | 2000 | 1.09 | 2.55 | 1180 | 1400 | 3.58 |
| | 2000 | 1.10 | 2.53 | 1192 | 1403 | 3.22 |
| 2-decanone (bp 211° C.) | | | | | | |
| | 0 | 0.89 | 1.36 | 964 | 1067 | 5.77 |
| | 0 | 0.89 | 1.36 | 966 | 1080 | 5.95 |
| | 0 | 0.89 | 1.37 | 965 | 1054 | 5.57 |
| | 0 | 0.89 | 1.37 | 967 | 1075 | 5.86 |
| | 5 | 1.19 | 1.45 | 1295 | 1533 | 5.33 |
| | 5 | 1.19 | 1.42 | 1288 | 1526 | 5.46 |
| | 5 | 1.18 | 1.43 | 1284 | 1496 | 5.20 |
| | 10 | 1.37 | 1.88 | 1492 | 1936 | 5.12 |
| | 10 | 1.37 | 1.91 | 1490 | 1951 | 5.32 |
| | 10 | 1.37 | 1.90 | 1486 | 1949 | 5.42 |
| | 20 | 1.56 | 3.04 | 1689 | 2368 | 3.11 |
| | 20 | 1.51 | 3.26 | 1635 | 2276 | 3.11 |
| | 20 | 1.49 | 3.21 | 1620 | 2278 | 3.18 |
| | 20 | 1.50 | 3.22 | 1628 | 2313 | 3.29 |
| | 50 | 1.75 | 3.82 | 1901 | 3267 | 3.48 |
| | 50 | 1.74 | 3.80 | 1886 | 3189 | 3.35 |
| | 50 | 1.74 | 3.76 | 1886 | 3202 | 3.34 |
| | 100 | 1.89 | 4.07 | 2047 | 3733 | 2.73 |
| | 100 | 1.89 | 4.06 | 2046 | 3729 | 2.76 |
| | 100 | 1.89 | 4.07 | 2051 | 3750 | 2.84 |
| | 200 | 1.87 | 4.09 | 2034 | 3624 | 2.52 |
| 2-decanone | | | | | | |
| | 200 | 1.94 | 4.24 | 2099 | 3654 | 1.95 |
| | 200 | 1.93 | 4.25 | 2099 | 3715 | 1.96 |
| | 200 | 1.94 | 4.26 | 2102 | 3748 | 1.98 |
| | 500 | 1.74 | 3.87 | 1893 | 3178 | 2.86 |
| | 500 | 1.75 | 3.87 | 1903 | 3247 | 2.98 |
| | 500 | 1.76 | 3.90 | 1910 | 3279 | 2.98 |
| | 1000 | 1.54 | 3.42 | 1674 | 2346 | 2.47 |
| | 1000 | 1.54 | 3.41 | 1671 | 2380 | 2.67 |
| | 1000 | 1.54 | 3.44 | 1670 | 2393 | 2.67 |
| 2-undecanone (bp 231° C.) | | | | | | |
| | 0 | 0.89 | 1.85 | 971 | 1171 | 5.52 |
| | 0 | 0.89 | 1.85 | 968 | 1187 | 5.84 |
| | 0 | 0.89 | 1.83 | 972 | 1203 | 6.00 |
| | 5 | 0.78 | 1.41 | 844 | 1107 | 7.49 |
| | 5 | 0.81 | 1.43 | 881 | 969 | 5.23 |
| | 5 | 0.81 | 1.42 | 880 | 985 | 5.52 |
| | 5 | 0.80 | 1.41 | 872 | 988 | 5.65 |
| | 10 | 0.80 | 1.63 | 867 | 1112 | 7.36 |
| | 10 | 0.80 | 1.55 | 869 | 1209 | 8.87 |
| | 10 | 0.79 | 1.57 | 862 | 1236 | 9.05 |
| | 10 | 0.79 | 1.57 | 865 | 1241 | 9.10 |
| | 20 | 0.83 | 1.75 | 899 | 1300 | 8.39 |
| | 20 | 0.83 | 1.75 | 899 | 1300 | 8.39 |

TABLE-continued

| Additive | [Additive] ppm | H₂O dT °C. | Solution dx % | Abs. Load W | $h_o$ W/m²K | Subcooling °C. |
|---|---|---|---|---|---|---|
| | 20 | 0.82 | 1.73 | 889 | 1301 | 8.66 |
| | 20 | 0.68 | 1.43 | 746 | 984 | 9.35 |
| | 50 | 1.01 | 2.19 | 1101 | 2054 | 8.42 |
| | 50 | 1.01 | 2.16 | 1099 | 2075 | 8.56 |
| | 50 | 0.94 | 1.99 | 1023 | 1757 | 8.81 |
| | 100 | 1.06 | 1.92 | 1155 | 2531 | 9.51 |
| | 100 | 1.25 | 2.46 | 1356 | 2258 | 6.48 |
| 2-undecanone | | | | | | |
| | 100 | 1.27 | 2.55 | 1379 | 2394 | 6.56 |
| | 100 | 1.27 | 2.55 | 1379 | 2394 | 6.56 |
| | 100 | 1.27 | 2.55 | 1379 | 2394 | 6.56 |
| | 100 | 1.11 | 2.14 | 1206 | 1998 | 7.78 |
| | 100 | 1.11 | 2.14 | 1206 | 1998 | 7.78 |
| | 200 | 1.43 | 2.92 | 1550 | 3818 | 7.60 |
| | 200 | 1.46 | 2.87 | 1583 | 4075 | 7.76 |
| | 200 | 1.47 | 2.77 | 1599 | 3986 | 7.82 |
| | 500 | 1.62 | 3.18 | 1760 | 5332 | 7.34 |
| | 500 | 1.63 | 3.18 | 1773 | 5346 | 7.55 |
| | 500 | 1.63 | 3.18 | 1773 | 5346 | 7.55 |
| | 500 | 1.65 | 3.24 | 1790 | 5356 | 7.66 |
| | 1000 | 1.67 | 0.59 | 1810 | 4481 | 11.54 |
| | 1000 | 1.43 | 0.15 | 1555 | 4635 | 14.46 |
| | 1000 | 1.43 | 0.15 | 1550 | 4626 | 14.54 |
| | 1000 | 1.42 | 2.58 | 1539 | 4585 | 9.77 |
| | 1000 | 1.52 | 2.88 | 1655 | 4783 | 8.57 |
| | 1000 | 1.51 | 2.85 | 1642 | 4716 | 8.68 |
| | 1000 | 1.52 | 2.85 | 1648 | 4767 | 8.79 |
| | 1500 | 1.64 | 3.03 | 1785 | 4133 | 6.34 |
| | 1500 | 1.65 | 3.05 | 1792 | 4234 | 6.52 |
| | 1500 | 1.69 | 3.13 | 1837 | 4316 | 6.76 |
| 2-decalone (bp 96° C. @ 2.5 mm) | | | | | | |
| | 0 | 0.89 | 1.36 | 964 | 1067 | 5.77 |
| | 0 | 0.89 | 1.36 | 966 | 1080 | 5.95 |
| | 0 | 0.89 | 1.37 | 965 | 1054 | 5.57 |
| | 0 | 0.89 | 1.37 | 967 | 1075 | 5.86 |
| | 5 | 1.19 | 1.45 | 1295 | 1533 | 5.33 |
| | 5 | 1.19 | 1.42 | 1288 | 1526 | 5.46 |
| 2-decalone | | | | | | |
| | 5 | 1.18 | 1.43 | 1284 | 1496 | 5.20 |
| | 10 | 1.37 | 1.88 | 1492 | 1936 | 5.12 |
| | 10 | 1.37 | 1.91 | 1490 | 1951 | 5.32 |
| | 10 | 1.37 | 1.90 | 1486 | 1949 | 5.42 |
| | 20 | 1.56 | 3.04 | 1689 | 2368 | 3.11 |
| | 20 | 1.51 | 3.26 | 1635 | 2276 | 3.11 |
| | 20 | 1.49 | 3.21 | 1620 | 2278 | 3.18 |
| | 20 | 1.50 | 3.22 | 1628 | 2313 | 3.29 |
| | 50 | 1.75 | 3.82 | 1901 | 3267 | 3.48 |
| | 50 | 1.74 | 3.80 | 1886 | 3189 | 3.35 |
| | 50 | 1.74 | 3.76 | 1886 | 3202 | 3.34 |
| | 100 | 1.89 | 4.07 | 2047 | 3733 | 2.73 |
| | 100 | 1.89 | 4.06 | 2046 | 3729 | 2.76 |
| | 100 | 1.89 | 4.07 | 2051 | 3750 | 2.84 |
| | 200 | 1.87 | 4.09 | 2034 | 3624 | 2.52 |
| | 200 | 1.94 | 4.24 | 2099 | 3654 | 1.95 |
| | 200 | 1.93 | 4.25 | 2099 | 3715 | 1.96 |
| | 200 | 1.94 | 4.26 | 2102 | 3748 | 1.98 |
| | 500 | 1.74 | 3.87 | 1893 | 3178 | 2.86 |
| | 500 | 1.75 | 3.87 | 1903 | 3247 | 2.98 |
| | 500 | 1.76 | 3.90 | 1910 | 3279 | 2.98 |
| | 1000 | 1.54 | 3.42 | 1674 | 2346 | 2.47 |
| | 1000 | 1.54 | 3.41 | 1671 | 2380 | 2.67 |
| | 1000 | 1.54 | 3.44 | 1670 | 2393 | 2.67 |
| 5-nonanone (bp 186° C.) | | | | | | |
| | 0 | 0.87 | 1.76 | 949 | 1091 | 5.84 |
| | 0 | 0.86 | 1.72 | 939 | 1083 | 5.84 |
| | 0 | 0.87 | 1.72 | 941 | 1088 | 5.88 |
| | 0 | 0.86 | 1.72 | 938 | 1086 | 5.90 |
| | 5 | 1.26 | 3.06 | 1365 | 1937 | 4.63 |

TABLE-continued

| Additive | [Additive] ppm | H₂O dT °C. | Solution dx % | Abs. Load W | h₀ W/m²K | Subcooling °C. |
|---|---|---|---|---|---|---|
| 5-nonanone | | | | | | |
| | 5 | 1.20 | 2.84 | 1306 | 1694 | 4.47 |
| | 5 | 1.19 | 2.83 | 1290 | 1645 | 4.37 |
| | 5 | 1.17 | 2.79 | 1272 | 1626 | 4.42 |
| | 10 | 1.20 | 2.73 | 1300 | 1929 | 5.64 |
| | 10 | 1.14 | 2.61 | 1241 | 1750 | 5.56 |
| | 10 | 1.14 | 2.62 | 1240 | 1753 | 5.59 |
| | 10 | 1.13 | 2.58 | 1223 | 1722 | 5.52 |
| | 20 | 1.20 | 2.73 | 1308 | 2048 | 6.08 |
| | 20 | 1.17 | 2.64 | 1269 | 1860 | 5.94 |
| | 20 | 1.15 | 2.63 | 1250 | 1811 | 5.90 |
| | 20 | 1.15 | 2.63 | 1246 | 1777 | 5.87 |
| | 50 | 1.26 | 2.89 | 1369 | 2234 | 5.89 |
| | 50 | 1.25 | 2.88 | 1356 | 2187 | 5.94 |
| | 50 | 1.24 | 2.82 | 1343 | 2148 | 6.00 |
| | 200 | 1.20 | 2.74 | 1308 | 2230 | 6.89 |
| | 100 | 1.21 | 2.88 | 1318 | 2130 | 6.50 |
| | 100 | 1.19 | 2.77 | 1291 | 2100 | 6.49 |
| | 100 | 1.17 | 2.72 | 1276 | 2032 | 6.52 |
| | 100 | 1.16 | 2.69 | 1266 | 1973 | 6.51 |
| | 200 | 1.20 | 2.76 | 1308 | 2339 | 7.00 |
| | 200 | 1.20 | 2.78 | 1305 | 2283 | 6.89 |
| | 200 | 1.16 | 2.72 | 1263 | 2153 | 6.92 |
| | 500 | 1.09 | 2.45 | 1189 | 2307 | 8.09 |
| | 500 | 1.09 | 2.44 | 1183 | 2290 | 8.13 |
| | 500 | 1.10 | 2.47 | 1195 | 2314 | 8.15 |
| | 1000 | 1.05 | 2.28 | 1145 | 2242 | 8.51 |
| | 1000 | 1.04 | 2.23 | 1131 | 2207 | 8.38 |
| | 1000 | 1.05 | 2.31 | 1139 | 2198 | 8.34 |
| 3-octanone (bp 167° C.) | | | | | | |
| | 0 | 1.35 | 1.81 | 896 | 984 | 3.11 |
| 3-octanone | | | | | | |
| | 0 | 1.29 | 1.80 | 855 | 994 | 3.86 |
| | 0 | 1.39 | 1.84 | 929 | 1087 | 4.50 |
| | 0 | 1.38 | 1.82 | 916 | 1082 | 4.54 |
| | 50 | 2.24 | 2.82 | 1482 | 3078 | 5.75 |
| | 50 | 2.32 | 2.98 | 1533 | 3292 | 5.69 |
| | 50 | 2.27 | 2.76 | 1514 | 3348 | 6.38 |
| | 200 | 2.34 | 3.52 | 1549 | 3438 | 5.86 |
| | 200 | 2.34 | 3.19 | 1549 | 3496 | 5.60 |
| | 200 | 2.35 | 3.17 | 1555 | 3478 | 5.45 |
| | 500 | 2.31 | 3.04 | 1529 | 4217 | 6.40 |
| | 500 | 2.34 | 3.16 | 1548 | 3903 | 6.08 |
| | 500 | 2.35 | 3.11 | 1550 | 3930 | 6.10 |
| | 500 | 2.36 | 2.94 | 1558 | 4629 | 6.77 |
| | 1000 | 2.34 | 3.36 | 1550 | 4110 | 6.23 |
| | 1000 | 2.35 | 3.01 | 1553 | 4797 | 6.89 |
| | 1000 | 2.35 | 3.01 | 1553 | 4797 | 6.89 |
| | 1000 | 2.30 | 2.98 | 1607 | 4423 | 6.45 |
| | 2000 | 1.88 | 2.56 | 1243 | 3579 | 8.35 |
| | 2000 | 2.08 | 2.77 | 1378 | 4004 | 7.73 |
| | 2000 | 1.82 | 2.30 | 1200 | 3527 | 9.49 |
| cyclooctanone (bp 195° C.) | | | | | | |
| | 53.5 | 2.44 | 3.31 | 1613 | 2935 | 2.31 |
| | 53.5 | 2.45 | 3.31 | 1620 | 2798 | 1.97 |
| | 53.5 | 2.45 | 3.33 | 1619 | 2822 | 2.05 |
| | 53.5 | 2.49 | 3.26 | 1646 | 2916 | 1.96 |
| | 102 | 2.63 | 3.53 | 1739 | 3414 | 1.62 |
| | 102 | 2.61 | 3.58 | 1726 | 3462 | 1.82 |
| | 102 | 2.64 | 3.56 | 1742 | 3449 | 1.51 |
| | 152 | 2.66 | 3.36 | 1759 | 3503 | 1.97 |
| | 152 | 2.68 | 3.41 | 1769 | 3514 | 1.93 |
| cycloocta-none | | | | | | |
| | 152 | 2.68 | 3.50 | 1770 | 3440 | 1.77 |
| | 152 | 2.69 | 3.47 | 1780 | 3391 | 1.64 |
| | 260 | 2.69 | 3.79 | 1780 | 3500 | 0.91 |
| | 260 | 2.68 | 3.86 | 1774 | 3465 | 0.93 |
| | 260 | 2.68 | 3.82 | 1772 | 3416 | 0.62 |
| | 260 | 2.69 | 3.85 | 1776 | 3390 | 0.65 |

TABLE-continued

| Additive | [Additive] ppm | H₂O dT °C. | Solution dx % | Abs. Load W | $h_o$ W/m²K | Subcooling °C. |
|---|---|---|---|---|---|---|
| | 497 | 2.59 | 3.64 | 1715 | 3344 | 1.41 |
| | 497 | 2.63 | 3.54 | 1738 | 3383 | 1.21 |
| | 497 | 2.62 | 3.59 | 1735 | 3307 | 1.00 |
| | 497 | 2.63 | 3.56 | 1736 | 3273 | 0.81 |
| | 1005 | 2.50 | 3.39 | 1653 | 3211 | 2.09 |
| | 1005 | 2.50 | 3.54 | 1656 | 3213 | 2.32 |
| | 1005 | 2.51 | 3.45 | 1657 | 3120 | 1.81 |
| | 1005 | 2.51 | 3.40 | 1660 | 3124 | 1.66 |
| | 2015 | 1.97 | 2.73 | 1303 | 2102 | 3.67 |
| | 2015 | 1.98 | 2.72 | 1308 | 2118 | 3.56 |
| | 2015 | 1.99 | 2.74 | 1316 | 2101 | 3.49 |
| | 2015 | 1.98 | 2.78 | 1311 | 2092 | 3.47 |
| 2,6-dimethylcyclohexanone (bp 174° C.) | | | | | | |
| | 52.1 | 2.33 | 2.79 | 1574 | 3826 | 5.55 |
| | 52.1 | 2.36 | 2.78 | 1592 | 3987 | 5.43 |
| | 52.1 | 2.36 | 2.76 | 1593 | 3917 | 5.39 |
| | 102 | 2.30 | 2.84 | 1549 | 4045 | 6.53 |
| | 102 | 2.26 | 2.89 | 1521 | 3632 | 6.27 |
| | 102 | 2.27 | 2.89 | 1531 | 3658 | 6.16 |
| | 260 | 2.21 | 2.87 | 1491 | 3951 | 6.50 |
| | 260 | 2.22 | 2.87 | 1497 | 3930 | 6.42 |
| | 260 | 2.23 | 2.92 | 1503 | 3974 | 6.36 |
| | 510 | 1.88 | 2.43 | 1268 | 2903 | 7.58 |
| | 510 | 2.03 | 2.66 | 1368 | 3364 | 7.17 |
| | 510 | 2.04 | 2.71 | 1376 | 3436 | 7.13 |
| | 999 | 1.67 | 1.93 | 1108 | 2308 | 8.67 |
| | 999 | 1.64 | 1.81 | 1086 | 2214 | 8.91 |
| | 999 | 1.61 | 1.78 | 1068 | 2146 | 8.97 |
| 4-ethylcyclohexanone (bp 192° C.) | | | | | | |
| | 1 | 0.98 | 1.97 | 1069 | 1264 | 5.15 |
| | 1 | 1.00 | 2.00 | 1087 | 1262 | 5.16 |
| | 1 | 1.02 | 2.03 | 1105 | 1284 | 4.83 |
| | 1 | 1.00 | 2.00 | 1088 | 1279 | 4.88 |
| | 1 | 1.00 | 2.00 | 1088 | 1279 | 4.88 |
| | 5 | 1.75 | 3.50 | 1899 | 3293 | 3.63 |
| | 5 | 1.73 | 3.51 | 1880 | 3505 | 4.31 |
| | 5 | 1.73 | 3.56 | 1880 | 3115 | 3.15 |
| | 10 | 1.88 | 3.67 | 2039 | 4352 | 4.48 |
| | 10 | 1.89 | 3.67 | 2045 | 4034 | 3.90 |
| | 10 | 1.88 | 3.73 | 2041 | 4270 | 4.29 |
| | 20 | 2.02 | 4.20 | 2192 | 5227 | 5.05 |
| | 20 | 2.04 | 4.25 | 2213 | 4840 | 3.81 |
| | 20 | 2.04 | 4.17 | 2210 | 4895 | 3.87 |
| | 50 | 2.12 | 4.20 | 2299 | 5413 | 4.05 |
| | 50 | 2.11 | 4.21 | 2288 | 5636 | 4.40 |
| | 50 | 2.11 | 4.20 | 2284 | 5340 | 3.88 |
| | 100 | 2.07 | 4.16 | 2248 | 5230 | 4.01 |
| | 100 | 2.06 | 4.14 | 2238 | 5532 | 4.52 |
| | 100 | 2.06 | 4.07 | 2239 | 5731 | 4.88 |
| | 200 | 1.95 | 4.03 | 2116 | 5384 | 5.22 |
| | 200 | 1.94 | 4.00 | 2107 | 5608 | 5.59 |
| | 200 | 1.93 | 3.95 | 2089 | 5730 | 5.94 |
| | 500 | 1.76 | 2.38 | 1910 | 4662 | 9.00 |
| 4-ethylcyclo-hexane | | | | | | |
| | 500 | 1.68 | 2.19 | 1822 | 5998 | 10.60 |
| | 500 | 1.66 | 2.17 | 1796 | 6108 | 10.71 |
| | 1000 | 1.43 | 1.82 | 1556 | 2749 | 8.45 |
| | 1000 | 1.42 | 1.82 | 1546 | 2914 | 9.04 |
| | 1000 | 1.42 | 1.82 | 1543 | 3065 | 9.54 |
| | 2000 | 1.24 | 1.56 | 1342 | 2686 | 10.07 |
| | 2000 | 1.27 | 1.57 | 1381 | 2741 | 9.95 |
| | 2000 | 1.25 | 1.56 | 1362 | 2814 | 10.31 |
| | 2000 | 1.27 | 1.57 | 1379 | 2594 | 9.77 |
| 3-decanone (bp 205° C.) | | | | | | |
| | 0 | 1.05 | 1.35 | 1138 | 1310 | 5.74 |
| | 0 | 1.04 | 1.30 | 1133 | 1320 | 5.72 |
| | 0 | 1.05 | 1.32 | 1140 | 1322 | 5.58 |
| | 5 | 1.66 | 3.27 | 1800 | 2923 | 4.13 |

TABLE-continued

| Additive | [Additive] ppm | H₂O dT °C. | Solution dx % | Abs. Load W | $h_o$ W/m²K | Subcooling °C. |
|---|---|---|---|---|---|---|
| | 5 | 1.40 | 3.29 | 1521 | 2217 | 4.72 |
| | 5 | 1.36 | 3.04 | 1477 | 1963 | 4.09 |
| | 5 | 1.35 | 3.07 | 1470 | 2011 | 4.42 |
| | 10 | 1.69 | 3.67 | 1829 | 3272 | 4.33 |
| | 10 | 1.63 | 3.57 | 1768 | 3145 | 4.95 |
| | 10 | 1.57 | 3.46 | 1702 | 3065 | 5.39 |
| | 20 | 1.83 | 3.89 | 1980 | 3394 | 3.42 |
| | 20 | 1.48 | 3.14 | 1608 | 2191 | 4.00 |
| | 20 | 1.72 | 3.79 | 1871 | 3375 | 4.57 |
| | 50 | 1.87 | 3.99 | 2030 | 3722 | 3.45 |
| | 50 | 1.81 | 4.08 | 1968 | 3665 | 3.89 |
| | 50 | 1.76 | 4.00 | 1914 | 3605 | 4.32 |
| | 100 | 1.91 | 3.78 | 2077 | 4559 | 4.62 |
| | 100 | 1.75 | 3.47 | 1901 | 3139 | 3.83 |
| | 100 | 1.71 | 3.40 | 1850 | 3241 | 4.54 |
| 3-decanone | | | | | | |
| | 100 | 1.69 | 3.29 | 1829 | 2944 | 3.82 |
| | 500 | 2.05 | 3.87 | 2228 | 4827 | 3.81 |
| | 500 | 2.01 | 3.80 | 2178 | 4808 | 4.13 |
| | 500 | 1.97 | 3.79 | 2139 | 4798 | 4.41 |
| | 1000 | 1.96 | 3.76 | 2129 | 4367 | 3.98 |
| | 1000 | 1.95 | 3.70 | 2112 | 4418 | 4.21 |
| | 1000 | 1.95 | 3.73 | 2114 | 4716 | 4.49 |
| | 2000 | 1.32 | 2.50 | 1438 | 2094 | 4.53 |
| | 2000 | 1.34 | 2.45 | 1450 | 2142 | 5.22 |
| | 2000 | 1.35 | 2.56 | 1465 | 2312 | 5.48 |

From the test results given in the Table, utilizing representative examples of ketones according to the invention, the improvements of the operating condition performance, taken from actual measurements of the laboratory bench test system as well as calculated values for fluid film heat transfer coefficients ($h_0$) are shown. Increases in heat transfer (H₂O dT), mass transfer (dx), and the absorber power load (W) are shown as are the significant decreases in solution subcooling at the operating conditions. Calculated values of film heat transfer coefficients ($h_0$) are also increased.

We claim:

1. In operation of an absorption cycle cooling and/or heating system including an absorber containing an aqueous metal salt absorption solution for absorbing water vapor therein and wherein said metal salt comprises an alkali metal halide, a method of improving the rate of water vapor absorption in said absorption solution comprising adding thereto an effective amount of between 2 and about 50,000 parts per million, by weight, of an aliphatic, cycloaliphatic, or aromatic ketone or aldehyde having between 5 and 24 carbon atoms for increasing the rate of water vapor absorption of said working fluid, and wherein the amount of said alkali metal halide present in the resulting absorption solution is at least about 40%, by weight, said aliphatic ketone being of the formula $R_1(C=O)R_2$ wherein $R_1$ and $R_2$ are the same or different alkyl and substituted alkyl groups of from 1 to 12 carbon atoms and wherein when $R_1$ is a methyl group the carbon atom of the other alkyl group $R_2$ attached to the carbonyl group is a primary or tertiary carbon atom.

2. A method of claim 1 wherein said ketone and said aldehyde are insoluble or slightly soluble in said working fluid and are liquid at 20° C. and above.

3. A method of claim 1 wherein the additive in said working fluid is an aliphatic ketone wherein said $R_1$ and $R_2$ are alkyl groups having from 1 to 8 carbon atoms.

4. A method of claim 1 wherein either or both of said alkyl groups are halogen substituted.

5. A method of claim 1 wherein either or both of said alkyl groups are fluoro substituted.

6. A method of claim 1 wherein said working fluid contains a mixture of said ketones.

7. A method of claim 1 wherein said working fluid contains a mixture of said aldehydes.

8. A method of claim 1 wherein said working fluid contains a mixture of one or more of said ketones and one or more of said aldehydes.

9. A method of claim 1 wherein said ketone and said aldehyde are substantially completely soluble in said working fluid at 20° C. and above.

10. A method of claim 1 wherein said working fluid contains between 2 ppm and about 20,000 ppm, by weight of said additive.

11. A method of claim 1 wherein said working fluid contains between 2 ppm and about 10,000 ppm, by weight of said additive.

12. A method of claim 1 wherein the additive is a ketone selected from the group consisting of 2-pentanone, 3-pentanone, 4-methyl-2-pentanone, 2,4-dimethyl-3-pentanone, 2-hexanone, 3,3-dimethyl-2-hexanone, 4-methyl-2-hexanone, 5-methyl-2-hexanone, 2-heptanone, 3-heptanone, 4-heptanone, 2-octanone, 3-octanone, 4-octanone, nonanone, decanone, undecenone, cyclohexanone, dimethylcyclohexanone, ethylcyclohexanone, cyclooctanone, methylpropiophenone, decalone, tetralone, benzophenone and acetophenone.

13. A method of claim 1 wherein the additive is an aliphatic aldehyde having between 6 and 14 carbon atoms.

14. A method of claim 1 wherein said aldehyde is halogen substituted.

15. A method of claim 1 wherein said working fluid contains lithium bromide and one or more salts selected from the group consisting of $ZnCl_2$, $ZnBr_2$, $MnCl_2$, $MnBr_2$, $MgCl_2$, $MgBr_2$, $SrCl_2$, $SrBr_2$, $FeCl_2$, $FeBr_2$, $CaCl_2$, $CaBr_2$, LiCl, LiI, $LiNO_2$, $LiNO_3$, LiSCN and $LiClO_3$.

16. A method of claim 1 wherein said cooling and/or heating system comprises a single or double effect absorption apparatus and wherein said metal salt comprises lithium bromide.

17. In operation of an absorption cycle cooling and/or heating system in which water is the sole refrigerant, the system including an absorber containing an aqueous metal salt or metal hydroxide absorption solution for absorbing water vapor therein and wherein said metal salt is an alkali metal halide or mixtures thereof and said metal hydroxide is sodium hydroxide, potassium hydroxide or mixtures of said hydroxides, a method of improving the rate of water vapor absorption in said absorption solution comprising adding thereto an effective amount of at least 2 parts per million, by weight, of an aliphatic, cycloaliphatic, or aromatic ketone having between 5 and 24 carbon atoms said aliphatic ketone being of the formula $R_1(C=O)R_2$ wherein $R_1$ and $R_2$ are the same or different alkyl and substituted alkyl groups of from 1 to 12 carbon atoms and wherein when $R_1$ is a methyl group, the carbon atom of the other alkyl group $R_2$ attached to the carbonyl group is a primary or tertiary carbon atom, and wherein the amount of said alkali metal halide present in said absorber is at least about 40%, by weight, and the amount of hydroxide present in said absorber is at least about 30%, by weight, of said working fluid.

18. A method of claim 17 wherein the absorption solution contains a lithium halide metal salt.

19. A method of claim 17 wherein the absorption solution contains lithium bromide.

20. A method of claim 19 wherein the additive is a ketone selected from the group consisting of 2-pentanone, 3-pentanone, 4-methyl-2-pentanone, 2,4-dimethyl-3-pentanone, 2-hexanone, 3-hexanone, 3,3-dimethyl-2-hexanone, 4-methyl-2-hexanone, 5-methyl-2-hexanone, 2-heptanone, 3-heptanone, 4-heptanone, 2,4-dimethyl-4-heptanone, 2-octanone, 3-octanone, 4-octanone, nonanone, decanone, undecanone, cyclohexanone, dimethylcylohexanone, ethylcyclohexanone, cylooctanone, methylpropiophenone, decalone, tetralone, acetophenone and benzophenone.

21. A method of claim 19 wherein said additive is a ketone, and wherein said working fluid comprises an aqueous solution of sodium hydroxide, potassium hydroxide or mixtures thereof.

22. A method of claim 21 wherein said working fluid includes one or more of cesium hydroxide, rubidium hydroxide or lithium hydroxide.

* * * * *